US011836072B2

United States Patent
Majithia et al.

(10) Patent No.: US 11,836,072 B2
(45) Date of Patent: Dec. 5, 2023

(54) RISK-BASED ROOT CAUSE IDENTIFICATION METHODS AND RELATED AUTOBUILD SYSTEMS

(71) Applicant: salesforce.com, inc., San Francisco, CA (US)

(72) Inventors: Hemali Majithia, Pleasanton, CA (US); Seth Tager, San Francisco, CA (US); Chinmoy Samant, San Francisco, CA (US); Stacy Gordon, San Francisco, CA (US); Peng Zhao, San Ramon, CA (US); Kailin Huang, San Francisco, CA (US); Shaun Phillips, Austin, TX (US); Lauren Valdivia, Lewistown, PA (US); Fabrice Medio, San Francisco, CA (US)

(73) Assignee: salesforce.com, inc.

( * ) Notice: Subject to any disclaimer, the term of this patent is extended or adjusted under 35 U.S.C. 154(b) by 137 days.

(21) Appl. No.: 17/445,714

(22) Filed: Aug. 23, 2021

(65) Prior Publication Data
US 2023/0055527 A1     Feb. 23, 2023

(51) Int. Cl.
*G06F 11/07* (2006.01)
*G06F 11/36* (2006.01)

(52) U.S. Cl.
CPC ........ *G06F 11/3688* (2013.01); *G06F 11/079* (2013.01); *G06F 11/0772* (2013.01);
(Continued)

(58) Field of Classification Search
CPC ............. G06F 11/3688; G06F 11/0772; G06F 11/079; G06F 11/3684; G06F 11/3692;
(Continued)

(56) References Cited

U.S. PATENT DOCUMENTS 5,577,188 A    11/1996  Zhu
5,608,872 A     3/1997  Schwartz et al.
(Continued)

OTHER PUBLICATIONS

Jason Ansel et al., Language-Independent Sandboxing of Just-In-Time Compilation and Self-Modifying Code, Jun. 4-8, 2011, [Retrieved on Jun. 16, 2023]. Retrieved from the internet: <URL: https://dl.acm.org/doi/pdf/10.1145/1993498.1993540> 12 Pages (355-366) (Year: 2011).*

*Primary Examiner* — Anibal Rivera
(74) *Attorney, Agent, or Firm* — Lorenz & Kopf, LLP

(57) ABSTRACT

Database systems and methods are provided for identifying a change associated with an update to executable code resulting in test failure. One method involves calculating risk scores for different changes associated with the update based on change characteristics associated with the respective changes, identifying a change from among the different changes associated with the update based on the risk scores associated with the respective changes, generating a modified update to the executable code that includes the identified change and excludes remaining changes of the update from the modified update, and initiate execution of one or more tests with respect to a compiled version of the modified update to the executable code. When execution of the one or more tests against the modified update results in a test failure, the change is identified as a potential root cause of the test failure associated with the update.

17 Claims, 5 Drawing Sheets

(52) U.S. Cl.
CPC ...... *G06F 11/3684* (2013.01); *G06F 11/3692* (2013.01); *G06F 11/368* (2013.01); *G06F 11/3616* (2013.01); *G06F 11/3664* (2013.01)

(58) Field of Classification Search
CPC . G06F 11/3664; G06F 11/368; G06F 11/3616
See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0036407 A1* | 2/2013 | Zheng | G06F 11/0709 717/135 |

(56) References Cited

U.S. PATENT DOCUMENTS

| | | |
|---|---|---|
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0067394 A1* | 3/2015 | Naseh ................. G06F 11/0709 714/15 |
| 2019/0294528 A1* | 9/2019 | Avisror ............... G06F 11/3688 |
| 2019/0294531 A1* | 9/2019 | Avisror ............... G06F 11/3684 |
| 2020/0379868 A1* | 12/2020 | Dherange .............. G06N 20/20 |
| 2021/0019249 A1* | 1/2021 | Gnaneswaran .. G06Q 10/06398 |
| 2022/0179777 A1* | 6/2022 | Bhat .................... G06F 18/214 |

* cited by examiner

US 11,836,072 B2

RISK-BASED ROOT CAUSE IDENTIFICATION METHODS AND RELATED AUTOBUILD SYSTEMS

TECHNICAL FIELD

One or more implementations relate to the field of database systems, and more specifically, to methods and systems for detecting the root cause of failure resulting from tests run against executable code for an on-demand application platform using risk-based analysis.

BACKGROUND

Modern software development has evolved towards web applications and cloud-based applications that provide access to data and services via the Internet or other networks. Additionally, modern software development often employs testing in order to eliminate as many errors or "bugs" as possible before software is released for widespread use. For example, automated software testing techniques may be utilized to verify that a program performs consistent with its specified or intended behavior. Unit testing is one method of automated testing that targets individual functions, procedures, or other portions of source code, for example, by isolating parts of a software program to show that the individual constituent parts are correct. To this end, test cases are often created that specify the inputs, execution conditions, testing procedure, testing results, and/or the like that in combination define the respective tests to be performed on a given software program. Test cases are typically written for all functions and methods so that whenever a change causes a fault, it can be quickly identified and fixed, thereby ensuring that code meets its design and behaves as intended early in the development cycle.

In practice, as code increases in length and complexity and the number of test cases increase accordingly, it becomes increasingly difficult to identify problems and root causes when aspects of the code are changed. For example, an established cloud computing platform capable of supporting a wide range of functionality could have thousands, if not millions, of test cases that may be utilized to verify the core platform service source code performs consistent with its specified or intended behavior. During subsequent development, one or more members of a development team may make various changes to the source code, which may result in one or more failed tests when a batch of tests are run against the modified source code. However, when a large number of automated tests are run against source code including multiple different changes, it is difficult to identify which particular change caused any given test failure, and often requires a search algorithm to iteratively repeat test execution until arriving at the particular change that was the likely root cause of a given test failure. This requires an undesirable amount of time and computational resources. Accordingly, it is desirable to reduce the amount of time and effort required for developers to analyze test results and identify and resolve errors within source code.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
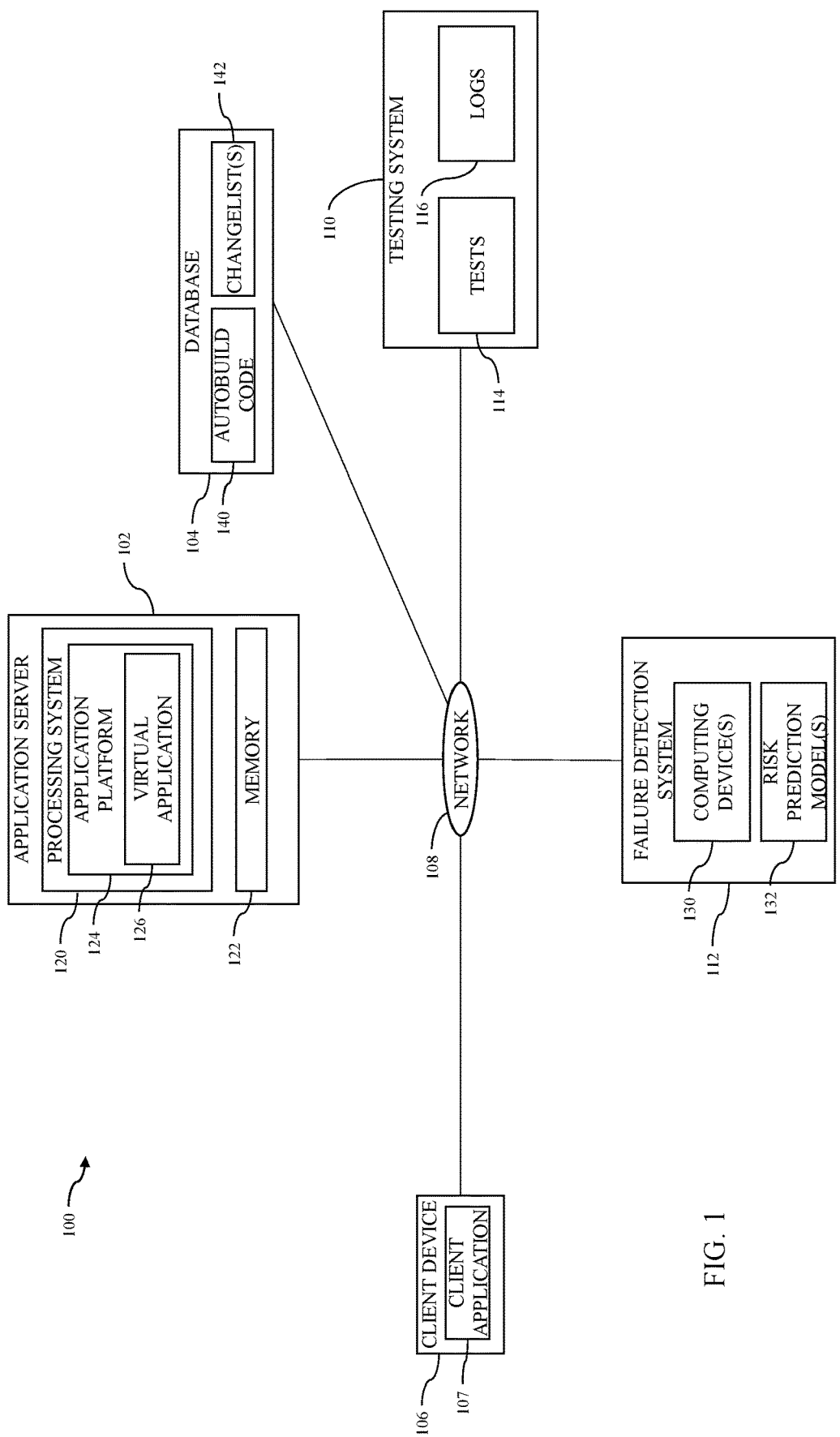
FIG. 1 is a block diagram illustrating a computing system according to some example implementations.

The subject matter described herein generally relates to computing systems and methods for identifying which change or update to computer-executable code is responsible for a test failure when multiple test cases are executed against a version of the computer-executable code that includes multiple different changes or updates. For purposes of explanation, the subject matter may be described herein primarily in the context of executable code for an application platform capable of concurrently providing instances of a virtual application to one or more different end users, such as, for example, an automatically compiled branch of source code for the application platform. In such implementations, when a software developer makes a change with respect to the source code for a particular version of the application platform, an autobuild system supporting a continuous integration/continuous deployment (CI/CD) pipeline may automatically compile the updated source code into an executable version of the updated source code for the application platform. In this regard, the autobuild system may incorporate multiple different changes or updates, which may be submitted by any number of different developers, into the automatically compiled updated source code for the application platform. The autobuild system compiling the updated source code may then trigger a testing system executing a plurality of tests against the compiled executable code for the application platform to generate a corresponding log file including data associated with the performance of the code with respect to the respective tests.

When execution of one or more tests against the updated compilation of the executable code for the application platform result in a failure, a risk score is assigned to each change associated with the update, which, in turn, may be utilized to identify which change is the most likely root cause of the failure of a particular test. In exemplary implementations, one or more characteristics or metadata that are associated with or otherwise characterize or define a respective change are input to a risk calculation model, which, in turn, calculates a respective value for the risk score to be assigned to the respective change as a function of those input characteristics. Thereafter, the change having the highest value for the risk score from among the respective values for the risk score associated with all of the changes in the update may be identified as the change most likely to be the cause of the failure. Once the highest risk change is identified from among all of the changes associated with an update, a modified update of the source code may be generated that includes only the highest risk change from the batch of changes associated with the update (e.g., by excluding remaining changes from compilation) before automatically compiling the modified update of the source code into an executable version. The testing system may then re-execute one or more previously-failed tests against the compiled version of the modified update to verify or otherwise confirm that the highest risk change caused the failure of the test(s).

When the highest risk change results in a subsequent test failure, the change may be identified as a probable root cause of the test failure and designated for triage or other remedial action (e.g., by flagging or otherwise removing the change from the current update) without requiring a more exhaustive search algorithm to identify the probable root cause (e.g., a binary search algorithm or the like). On the other hand, when the previously-failed tests execute successfully against the modified update, the change having the next highest value for the risk score may be selected for analysis (e.g., by generating another modified update of the source code that includes only the next highest risk change, compiling and executing tests against the new modified update, etc.) to iteratively and incrementally re-execute one or more previously-failed tests against individual changes in a risk descending order until arriving at the probable root cause of the failure. By using risk-based stratification and analysis of changes, the amount of time and resources required to identify the root cause can be reduced, thereby increasing testing velocity, shortening development cycles, and improving product quality and performance.

FIG. 1 depicts an exemplary implementation of a computing system 100 for identifying a probable root cause of failure associated with changes or updates to executable code, such as a compiled version of executable source code for an application platform 124 provided by a server 102. In the illustrated implementation, a server 102 is communicatively coupled to a database 104 and one or more instances of client devices 106 via a communications network 108. The communications network 108 may be realized as any sort or combination of wired and/or wireless computer network, a cellular network, a mobile broadband network, a radio network, the Internet, or the like. A testing system 110 is communicatively coupled to the communications network 108 to support automated testing of the compiled executable code and generation of corresponding log files that maintain the performance data and other results associated with a respective test run, as described in greater detail below. A fault detection system 112 is communicatively coupled to the communications network 108 and configurable to provide a fault detection service. In one or more implementations, the fault detection service is configurable to analyze log files generated by the testing system 110 and corresponding change lists to identify the particular change or update that is the likely root cause of a test failure associated with a respective log file, as described in greater detail below.

It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 102 to various instances of client devices 106. Additionally, practical implementations may include multiple instances of the server 102 and/or the database 104, which, in turn may reside behind or rely on one or more load balancers to manage resource utilization, as will be appreciated in the art. Furthermore, although the database 104 is depicted separate from the application server 102, in practice, the database 104 may be integrated or otherwise combined with the application server 102 as part of an integrated database system. Alternatively, the database 104 may be integrated or otherwise combined with the testing system 110 and/or the fault detection system 112. Moreover, in some implementations, the features and/or functionality described herein in the context of one or more of the systems 110, 112 may be implemented or otherwise performed by or at the server 102 and/or the database 104, and in which case a respective system 110, 112 may not exist on separate or distinct hardware within the computing system 100.

The server 102 generally represents a computing device, computing system or another combination of processing logic, circuitry, hardware, and/or other components configured to support the processes, tasks, operations, and/or functions described herein. In this regard, the server 102 generally includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the implementation, the memory 122 may be realized as a random-access memory (RAM), read only memory (ROM), flash memory, magnetic or optical mass storage, or any other suitable non-transitory short or long-term data storage or other computer-readable media, and/or any suitable combination thereof. In one or more implementations, the programming instructions cause the processing system 120 to create, generate, or otherwise facilitate an application platform 124 that supports or otherwise facilitates the processes, tasks, operations, and/or functions described herein. In some implementations, the application platform 124 may also generate or otherwise provide instances of a virtual application at run-time (or "on-demand") based at least in part upon code and other data that is stored or otherwise maintained by a database (e.g., database 104), such that the server 102 functions as an application server 102.

Similarly, the testing system 110 generally includes a server or other computing device, computing system or another combination of processing logic, circuitry, hardware, and/or other components configured to support the processes, tasks, operations, and/or functions described herein. In exemplary implementations, the testing system 110 includes processing system that includes or accesses a data storage element storing executable instructions or code that cause the processing system to create, generate, or otherwise facilitate a testing application that supports executing a plurality of test cases 114, alternatively referred to herein as a test run, with respect to compiled code executed by the processing system 120 at the application server 102 to provide the application platform 124. The testing application stores or otherwise maintains the results of the test run in a log file 116 maintained in a data storage element associated with the testing system 110. In one or more implementations, the testing application is realized as an application programming interface (API), software agent, or the like that is capable of interacting with another element in the computing system 100, such as the client device 106, the application server 102, the testing system 110 and/or the database 104, as described in greater detail below.

In exemplary implementations, the fault detection system 112 includes one or more computing devices 130, which may be realized as one or more server computing systems or other suitable processing systems or combinations of processing logic, circuitry, hardware, and/or other components configured to support the processes, tasks, operations, and/or functions described herein. The fault detection system 112 also includes a data storage element or memory configured to store or otherwise maintain one or more risk prediction models 132 generated by the fault detection system 112 and utilized to identify highest risk changes associated with a particular code version, as described in greater detail below. The data storage element or memory associated with the fault detection system 112 may also maintain executable instructions or code that cause a computing device 130 of the fault detection system 112 to create, generate, or otherwise facilitate an analysis application that supports analyzing the changes or updates associated with a log file from a test run using the appropriate risk prediction model(s) 132 and provide corresponding indicia of the probable root cause(s) of test failure or other indicia of relative riskiness to another element of the computing system 100, such as the client device 106, the application server 102, the testing system 110 and/or the database 104, as described in greater detail below. In one or more implementations, the analysis application is realized as an application programming interface (API), software agent, or the like that is capable of interacting with another element of the computing system 100.

The client device 106 generally represents an electronic device coupled to the network 108 that may be utilized by a user to write or develop source code, update or otherwise make changes to existing source code, execute test cases on source code, review and/or analyze test results and corresponding log files to identify anomalies within log files, as described in greater detail below. In practice, the client device 106 can be realized as any sort of personal computer, mobile telephone, tablet or other network-enabled electronic device. In exemplary implementations, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that supports communication with the application platform 124 on the server 102 using a networking protocol. In some implementations, the client application 107 is realized as a web browser or similar local client application executed by the client device 106 that contacts the application server 102 and/or application platform 124 using a networking protocol, such as the hypertext transport protocol (HTTP) or the like. One or more client applications 107 at the client device 106 may variously be utilized to communicate with the testing system 110, the fault detection system 112, and/or the database 104.

In exemplary implementations, the database 104 stores or otherwise maintains one or more versions of source code that are executable by the processing system 120 at the server 102 to generate, facilitate, or otherwise provide the application platform 124 and generate one or more instances of a virtual application 126. For example, the database 104 may store compiled versions of source code corresponding to different versions of the application platform 124. In this regard, an autobuild system or other continuous integration/continuous deployment (CI/CD) pipeline may support and maintain compiled versions of source code for different versions of the application platform 124, such as, for example, a lower level version of the application platform 124 utilized by developers to make changes, modifications, or additions to the functionality of the application platform 124, one or more intermediate versions of the application platform 124 that may be utilized by developers and potentially some subset of end users or customers for debugging or performance analysis (e.g., beta testing), and a higher level version of the application platform 124 (e.g., a production version) that may be accessible to a broader set of end users, customers, or the like. In one implementation, the autobuild system is configured to automatically compile the source code for the respective versions of the application platform 124 on a continual and periodic basis (e.g., hourly, daily, weekly, or the like) and store the most recently compiled version of the source code for the respective application platform version in the database 104. For purposes of explanation, a compiled version of application platform version source code generated by an autobuild system is referred to herein as autobuild code 140. Additionally, in exemplary implementations, the database 104 stores or otherwise maintains, in association with each version or instance of autobuild code 140, a corresponding change list 142 that includes indicia of source code files that were changed or updated relative to a preceding version of the autobuild code 140 that correspond to the changes or updates to the executable source code for the application platform 124. For example, in one implementation, the change list 142 includes a list of source code file versions and indicates the changes relative to the previous versions.

In one or more implementations, an autobuild system may automatically compile the different versions of source code for the application platform 124 into different instances of autobuild code 140, and then initiate testing of the respective versions of autobuild code 140 by the testing system 110. For example, upon compiling source code for a version of the application platform 124, the autobuild system may utilize an API or similar feature to trigger the testing system 110 running a set of test cases 114 against the autobuild code 140. To test the autobuild code 140, the autobuild code 140 is loaded or otherwise executed by the processing system 120 at an application server 102 to generate the corresponding version of the application platform 124, which is then accessible to the testing system 110 via the network 108. In this manner, upon the source code being compiled, the newly built version(s) will go be tested against a set of predefined tests which are most applicable to the respective version(s). In practice, the application server 102 may be part of the autobuild system, or the autobuild system may include a duplicative or redundant instance of the server 102 that tests may be run against.

In exemplary implementations, the testing system 110 automatically runs one or more automated test cases, such as graphical user interface (GUI) tests, functional tests, unit tests, and/or the like, against the version of the application platform 124 (or with respect to an instance of the virtual application 126 generated by the respective version of the application platform 124) and creates a corresponding log data file 116 associated with the test run. For each test 114 that makes up the test run, the associated test result log data file 116 includes a line, row, or similar delineated entry associated with that respective test that includes various information characterizing or describing the execution of the test 114. For example, the log line may include, without limitation, descriptive information or data identifying the test 114 (e.g., one or more unique identifiers assigned to the test case), performance metrics or data associated with execution of the test 114 (e.g., the duration of time required to complete the test case, whether the result of the test corresponds to passing or failing the test case, etc.), contextual metadata characterizing the operating context for the test (e.g., the date and time of execution of the test, information identifying the particular server 102 the test was performed on or with respect to, and/or the like), and potentially other test result or debugging data, such as, HTTP callouts, errors, exceptions or other events generated during the test, automated processes or workflows invoked or involved in the test, database changes during the test, and/or the like. The resulting test result log data file 116 then includes a plurality of lines of data (alternatively referred to herein as log lines) corresponding to each individual test 114 that made up the respective test run, with the log data file 116 being stored or otherwise maintained in association with the particular autobuild code version (e.g., by associating each test result log data file 116 with an identifier or other indicia of the corresponding version of autobuild code 140). In this regard, in exemplary implementations, the log data file 116 includes an indicia of the particular change list 142 associated with the respective test run, which, in turn may be utilized to identify the individual constituent changes or updates that differentiate the particular autobuild code version from other versions.

Figure 2:
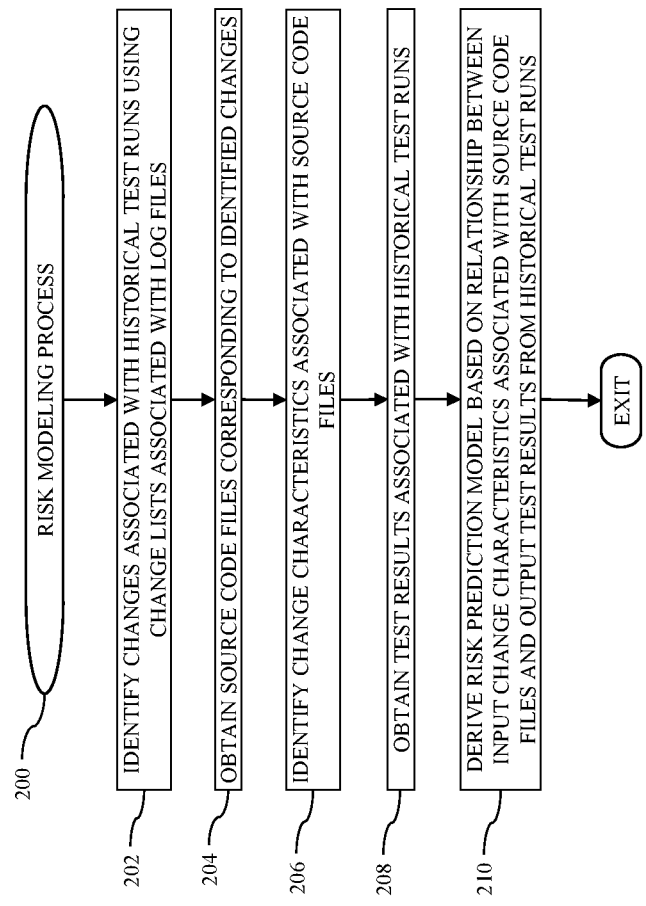
FIG. 2 is a flow diagram illustrating a risk modeling process suitable for use with the computing system according to some example implementations.

FIG. 2 depicts an exemplary risk modeling process 200 that may be implemented or otherwise performed by a computing system to enable modeling and assigning a relative risk to changes associated with an update to executable source code and perform additional tasks, functions, and/or operations described herein. For illustrative purposes, the following description may refer to elements mentioned above in connection with FIG. 1. In this regard, while portions of the risk modeling process 200 may be performed by different elements of the computing system 100, for purposes of explanation, the subject matter is described herein in the context of the risk modeling process 200 being primarily performed by the fault detection system 112. It should be appreciated that the risk modeling process 200 may include any number of additional or alternative tasks, the tasks need not be performed in the illustrated order and/or the tasks may be performed concurrently, and/or the risk modeling process 200 may be incorporated into a more comprehensive procedure or process having additional functionality not described in detail herein. Moreover, one or more of the tasks shown and described in the context of FIG. 2 could be omitted from a practical implementation of the risk modeling process 200 as long as the intended overall functionality remains intact.

The illustrated risk modeling process 200 initializes or otherwise begins by identifying or otherwise determining changes associated with a previous update to executable source code (task 202). For example, as described above, in one or more implementations, the log files 116 maintained by the testing system 110 may indicate the particular change list 142 and version of the autobuild code 140 associated with the test run for the respective log file 116. Thus, the fault detection system 112 may utilize the change list 142 associated with an existing log file 116 to identify the corresponding changes associated with a particular update to the autobuild code 140, and utilize the existing log files 116 to identify the different changes against which test runs have been previously performed and for which historical test result data exists.

For each identified change, the risk modeling process 200 retrieves or otherwise obtains the corresponding source code file that contains or embodies the respective change and then identifies, extracts or otherwise determines change characteristics or other metadata characterizing the respective change based on the source code file (task 204, 206). For example, the fault detection system 112 may utilize the change list 142 associated with a particular log file 116 to identify the file name, address or other resource locator corresponding to a particular change included in a particular version of the autobuild code 140 and then utilize the file name to retrieve or otherwise obtain the file that contains the source code for that change (e.g., a .java source code file). After obtaining the source code file that includes the source code for a particular change of the change list 142, the fault detection system 112 analyzes the source code file to derive, extract, identify or otherwise determine metadata or other characteristics that describe or otherwise define that particular change and/or the source code file containing the change. For example, the fault detection system 112 may execute one or more scripts or algorithms to determine values for different parameters or metrics that quantify or otherwise characterize the programming complexity of the source code included in the file for the change, such as, for example, a number of lines of source code contained within the file (excluding comments), a number of nested loops within the source code, a number of variables defined within the source code, a number of methods within the source code, a number of blocks within the source code, a number of fields within the source code, a number of tokens within the source code and/or other statistical measures of cyclomatic and/or programming complexity (e.g., the sum of the cyclomatic complexity of the methods, the average cyclomatic complexity of the methods, the average identifier length, the maximum number of lines of code associated with an individual method, the maximum number of nested loops associated with an individual block of code, an average number of variables per method and/or the like). In addition to determining quantitative complexity metrics associated with a particular change, in exemplary implementations, the fault detection system 112 also identifies or otherwise determines values for different parameters or variables that characterize qualitative aspects of the change, such as, for example, a work type associated with the change to the platform source code (e.g., a bug fix, a new feature and/or the like), a source control branch associated with the change (e.g., main, patch, etc.), reviews or other revision history associated with the change and/or the like. In some embodiments, the metadata characterizing the respective change is obtained from one or more other computer systems that maintains, such as, for example, a bug tracking system, a source control system, or the like.

Still referring to FIG. 2, the risk modeling process 200 retrieves or otherwise obtains test results from the historical test runs against the previous updates to the executable source code and derives or otherwise determines a risk prediction model for calculating or otherwise determining a metric indicative test failure as a function of the identified change characteristics associated with the respective changes contained within the historical test runs (tasks 208, 210). In this regard, the risk prediction model may be derived using machine learning or other artificial intelligence techniques to develop an equation or formula for calculating a numerical value corresponding to a probability of a change to the source code resulting in a test failure as a function of input change characteristic variables associated with a particular change based on historical relationships between the change characteristics associated with historical changes and the corresponding test results. For example, the fault detection system 112 may utilize machine learning or other artificial intelligence techniques to determine which change characteristics are more highly correlated with or predictive of the failure of a particular test or test run, and then determine a corresponding equation, function, or model for calculating a probability of test failure based on that set of input change characteristics. Thus, the resultant model is capable of characterizing or mapping the identified change characteristics (e.g., task 206) associated with a source code file for a change to an output value representative of the probability or likelihood of a test failure, which may alternatively be referred to herein as a risk score or risk metric for the change.

For example, in one implementation, the risk prediction model is realized as a random forest model that is trained to convert a set of input change characteristics associated with a source code file into an output value that represents a predicted outcome of a test run. The random forest risk prediction model includes decision trees or classifiers that determine respective values representative of a probability of test failure based on the combination of input values for the parameters or variables characterizing that source code file, with the output values from the decision trees being aggregated or otherwise combined to obtain an aggregate value indicative of a probability of test failure based on a set of input change characteristics associated with a particular source code file. In this regard, the decision trees are trained using different subsets of historical data to generate respective output values indicative of a probability of test failure as a function of an input number of lines of source code associated with a change to the source code, an input number of nested loops within the source code associated with the change, an input cyclomatic complexity metric for the source code associated with the change, and so on. The random forest risk prediction model is then trained to convert the output values from the constituent decision trees into an aggregate output value indicative of the probability of test failure. In this regard, relative weightings applied to the respective decision tree outputs may vary relative to one another based on differing correlations between the output values from the respective decision tree and the historical test failures in the training data.

In some implementations, the fault detection system 112 determines risk prediction models on a per-test basis based on historical relationships between the historical results of a respective test 114 (e.g., pass or fail) across different test runs and the change characteristics associated with the different changes included in those test runs, such that each automated test case 114 has an associated risk prediction model 132. For example, since each automated test case 114 may be directed to a different functionality, feature or aspect of the application platform 124, the input change characteristics that are predictive of or correlative to failure of a particular test case 114 may vary from other test cases 114. Thus, the relative weightings applied to the respective change characteristic input variables of the risk prediction model (or the respective decision trees associated therewith) may vary based on differing correlations between particular change characteristic input variables and the historical test results for that particular test case 114. That said, in other implementations, the risk prediction models may be determined on a per-test run basis to reflect or otherwise encompass the entire set of test cases 114 associated with a test run. Additionally, it should be noted that any number of different machine learning or artificial intelligence techniques may be utilized to determine what input change characteristic variables are predictive of a particular testing outcome, and the subject matter described herein is not intended to be limited to any particular type of risk prediction model or modeling technique.

Referring to FIG. 1 with reference to FIG. 2, in some implementations, a developer or other user of the client device 106 attempting to make an update to the application platform source code 140 or to add a new feature or functionality may utilize the risk prediction model(s) 132 for prognostic purposes prior to compilation. For example, the client application 107 at the client device 106 may be configured to provide a source code editor that allows a developer or other user of the client device 106 to make changes to the source code via the network 108. After updating the source code, the developer may initiate the fault detection system 112 (e.g., via an API call by the client application 107) analyzing the change to determine a risk score using the risk prediction model(s) 132 before committing the change to the autobuild code 140. For example, the developer may interact with the client application 107 to cause the client application 107 to execute a script and make an API call to the fault detection system 112 that includes the source code file(s) corresponding to the change. In response to the API call, the fault detection system 112 identifies, extracts or otherwise determines change characteristics or other metadata characterizing the respective change based on the source code file in a similar manner as described above (e.g., task 206) and then applies the risk prediction model(s) 132 to the change characteristics (e.g., by inputting the identified change characteristics into the risk prediction model(s) 132) to obtain an output value from the risk prediction model(s) 132 indicative of the probability or likelihood of a test failure based on the characteristics of the source code of the proposed change. In response to receiving the risk score(s) assigned to the proposed change, the client application 107 may provide graphical indicia of the risk score(s) at the client device 106, thereby providing feedback to the developer of the relative riskiness of the proposed change.

When the developer is satisfied with the risk score(s) (e.g., by verifying the risk score is less than a threshold probability of test failure), the developer may initiate compiling of the developer-modified source code (or the compiling may be initiated automatically by the application platform 124). For example, the autobuild system may compile the developer-modified source code, resulting in an updated lower level version of the autobuild code 140 for the application platform 124 that includes or otherwise incorporates the change(s) by the developer. The change list 142 generated for the updated lower level version of the autobuild code 140 includes information identifying the change to the source code (e.g., by including the file name, address and/or path associated with the new or modified source code files). Thereafter, the developer may initiate the testing system 110 (e.g., via an API call by the client application 107) performing a test run of test cases against the updated autobuild code (or the testing may be initiated automatically by the autobuild system via an API call) to generate a test result log file 116 that reflects the developer's updates to the source code for the application platform 124. In practice, the data in the resulting test result log file 116 may be analyzed to verify or otherwise confirm that a particular change is not the root cause of a test failure prior to migrating change to an intermediate or higher level version of the application platform 124 (e.g., a beta version, a production version, and/or the like).

Figure 3:
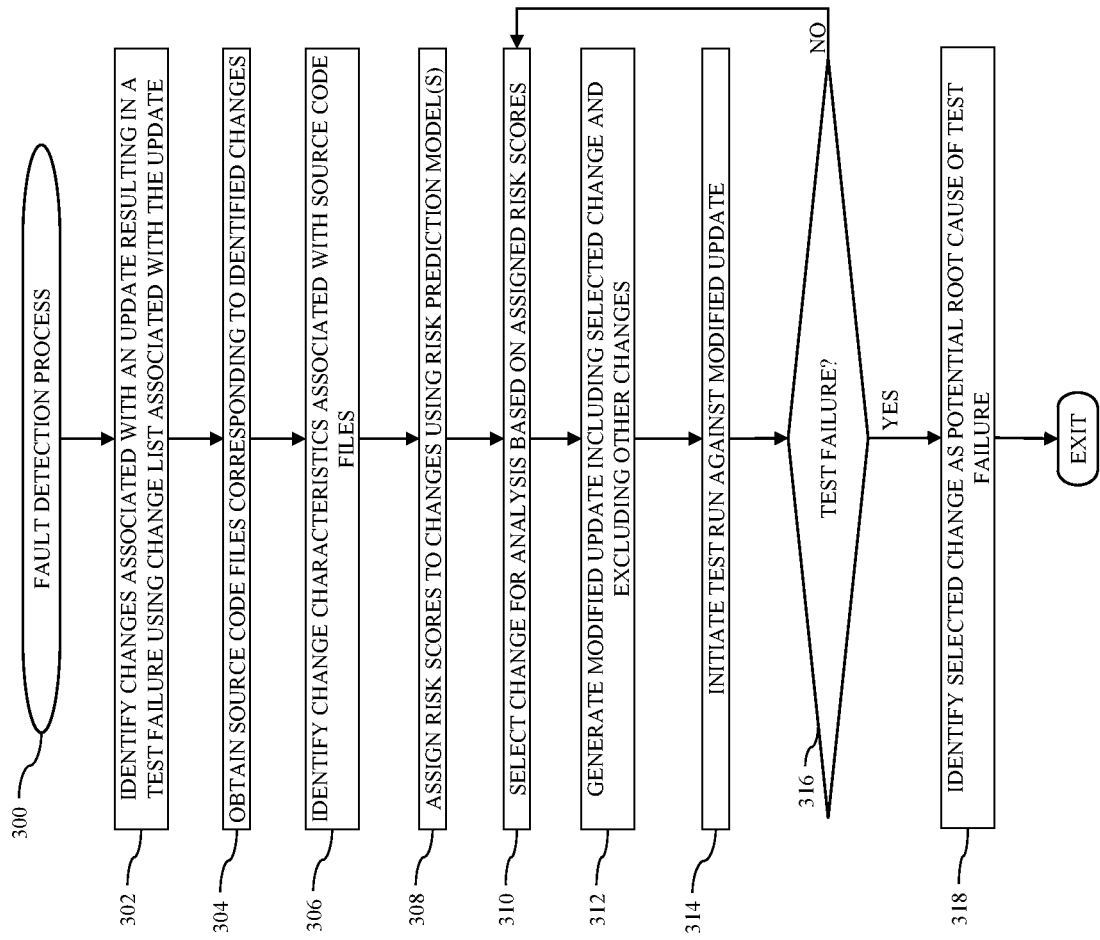
FIG. 3 is a flow diagram illustrating a fault detection process suitable for use with the computing system in connection with the risk modeling process of FIG. 2 according to some example implementations.

FIG. 3 depicts an exemplary fault detection process 300 that may be implemented or otherwise performed by a computing system in connection with the risk modeling process 200 to identify which particular change associated with an update to executable source code is the probable root cause of test failure and perform additional tasks, functions, and/or operations described herein. For illustrative purposes, the following description may refer to elements mentioned above in connection with FIG. 1. In this regard, while portions of the fault detection process 300 may be performed by different elements of the computing system 100, for purposes of explanation, the subject matter is described herein in the context of fault detection process 300 being primarily performed by the fault detection system 112. It should be appreciated that the fault detection process 300 may include any number of additional or alternative tasks, the tasks need not be performed in the illustrated order and/or the tasks may be performed concurrently, and/or the fault detection process 300 may be incorporated into a more comprehensive procedure or process having additional functionality not described in detail herein. Moreover, one or more of the tasks shown and described in the context of FIG. 3 could be omitted from a practical implementation of the fault detection process 300 as long as the intended overall functionality remains intact.

Referring to FIG. 3 with continued reference to FIGS. 1-2, depending on the implementation, the fault detection process 300 may be initiated automatically in response to a test run resulting in one or more test failures or manually by a user analyzing test logs to identify a change associated with an update to executable code that is likely to be a root cause of the test failure(s). For example, a developer may interact with a client application 107 being utilized to review testing log files 116 to make an API call to the fault detection system 112 that includes identification of the test result log file 116 to be analyzed (e.g., by providing a unique identifier that allows the fault detection system 112 to retrieve the appropriate test result log file 116 from the testing system 110 and identify the change list 142 associated with the test run). In other implementations, the fault detection system 112 may monitor the testing system 110 for new testing log files 116 that include one or more test failures, or the testing system 110 may push notifications to the fault detection system 112 to initiate the fault detection process 300 when a test run generates one or more test failures.

The fault detection process 300 initializes or otherwise begins by identifying the changes associated with an update to executable code that resulted in one or more test failures using a change list associated with the update (task 302). For example, in response to receiving indication of the test result log file 116 to be analyzed, the fault detection system 112 may utilize the change list 142 associated with the identified log file 116 or other information indicating the version of the autobuild code 140 that the log file 116 corresponds to identify the file names, addresses or other resource locators corresponding to the different changes that were included in that particular updated version of the autobuild code 140 which were not part of previous versions of the autobuild code 140. After identifying the changes associated with the update, the fault detection process 300 retrieves or otherwise obtains the source code files corresponding to the identified changes and analyzes the source code files to identify, quantify, qualify or otherwise determine change characteristics associated with the respective source code files (tasks 304, 306).

In a similar manner as described above, for each change associated with the update to the autobuild code 140 being analyzed, the fault detection system 112 may retrieve or otherwise obtain the file that contains the source code for that respective change and then analyze the source code file to derive, extract, identify or otherwise determine metadata or other characteristics that describe or otherwise define that particular change (e.g., tasks 204, 206).After identifying the change characteristics associated with each change of the update, the fault detection process 300 generates and assigns one or more risk score(s) to each change of the update based on the respective change characteristics associated with the respective change of the update using one or more risk prediction model(s) (task 308). In this regard, based on the test run and/or the automated tests 114 associated with the testing log file 116 under analysis, the fault detection system 112 identifies or otherwise obtains the appropriate risk prediction model(s) 132 for assessing the relative risk of a test failure with respect to the test run and/or an automated test 114 associated therewith. Thereafter, for each change of the update, the fault detection system 112 applies the risk prediction model(s) 132 by inputting the identified change characteristics associated with the respective change to the risk prediction model(s) 132 to obtain one or more output values indicating the probability or likelihood of the respective change generating a test failure with respect to the test run and/or an automated test 114 associated therewith. In this regard, the output value(s) from applying the risk prediction model(s) 132 to the input change characteristics associated with a respective change are assigned to the respective change as the risk score(s) associated with the respective change.

After assigning one or more risk scores to each change of the update, the fault detection process 300 identifies or otherwise selects a particular change for further analysis based on the assigned risk scores (task 310). In exemplary implementations, the fault detection system 112 initially identifies and selects the highest risk change from among the changes associated with the update that has the highest value for the risk score (or the highest aggregate or combined value across different constituent risk score) relative to the risk scores associated with the remaining changes associated with the update. After selecting a change for analysis, the fault detection process 300 automatically generates or otherwise creates a modified update to the executable code that includes only the selected change by excluding remaining changes from the change list and then initiates a test run against the modified update to verify or otherwise confirm whether the modified update still resulted in a test failure (tasks 312, 314, 316). For example, the fault detection system 112 may interface with an autobuild system and/or the testing system 110 to compile the source code for the application platform 124 into a modified version of compiled code that includes or otherwise incorporates the source code file(s) associated with the selected change while excluding the source code file(s) associated with the other changes in the change list 142 associated with the log file 116 under analysis. Thereafter, the testing system 110 is triggered (by the autobuild system or the fault detection system 112) to re-execute one or more automated tests 114 associated with the test run for the log file 116 under analysis against the compiled modified executable code for the application platform to generate a corresponding test result data associated with the performance of the source code of the selected change with respect to the respective tests. In this regard, in some implementations, the testing systems 110 may be configurable to only execute the subset of automated tests 114 associated with the test run for the log file 116 for which the previous test resulted in failure when executed against the updated autobuild code 140 including all of the changes in the change list 142. That said, in other implementations, the testing systems 110 may re-execute the entire suite of automated tests 114 that were previously executed against the updated autobuild code 140.

When the test run executed against the modified update completes successfully without a test failure, the fault detection process 300 may tag, mark, or otherwise designate the selected change within the change list as safe, validated, or the like before repeating the loop defined by tasks 310, 312, 314 and 316 to test individual changes iteratively and progressively in a risk descending order until arriving at a change that results in test failure. In this regard, after selecting and validating the highest risk change, the fault detection process 300 may select the next highest risk change from among the remaining changes associated with the update that has the highest value for the risk score relative to the risk scores associated with the remaining changes associated with the update and then reinitiate the test run against another autogenerated modified update that only includes the next highest risk change, and so on, until the modified update including the selected change results in a test failure. When the modified update results in a test failure, the fault detection process 300 identifies the selected change as the potential root cause of the test failure for the updated version of the executable code (task 318). For example, the fault detection process 112 may tag, mark, or otherwise designate the selected change within the change list as including a bug, error, or other potential fault. In implementations where a developer initiates the fault detection process 300 from a client application 107, the fault detection system 112 may respond to the API call by providing indicia of the file name, address, path, or other resource locator or identifier associated with the selected change to the client application 107 so that the developer can subsequently debug or analyze that particular change or otherwise exclude that change from future versions of the autobuild code 140. For example, in one implementation, the fault detection system 112 may generate a graphical user interface (GUI) display within the client application 107 at the client device 106 that includes a graphical representation of the file name, address, path and/or other identifier(s) associated with the change identified as the potential root cause of the test failure by an update to the autobuild code 140.

By progressively analyzing changes in a risk descending order, the fault detection process 300 may more quickly arrive at the change that is the root cause of a test failure by an update to executable source code without having to rely on binary search algorithms or other approaches that require more time and resources (e.g., to run more tests against more changes and code versions). In this regard, in some implementations, the risk modeling process 200 may be periodically repeated to adaptively and dynamically update the risk prediction model(s) 132 based on the performance of the fault detection process 300 to improve the performance of the risk prediction model(s) 132 at assigning risk scores to source code changes, and thereby reducing the number of times the loop defined by tasks 310, 312, 314 and 316 is repeated before identifying the root cause of the test failure to minimize the time and/or computing resources required to diagnose the test failure with respect to an update. It will be appreciated that the subject matter described herein is particularly advantageous in the context of updates to the core source code for a cloud computing platform or on-demand application platform, where the number of tests may otherwise require hours or days to be run and any given update may include numerous different changes. By identifying and isolating the highest risk change(s) within the update, the failed tests may be intelligently re-executed against changes in a risk descending order to detect the root cause(s) of the test failure more quickly. Increasing the testing velocity and more quickly identifying the root cause enables developers to more quickly debug or otherwise resolve potential errors, thereby shortening the development cycle and improving the performance of the application platform.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals — such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
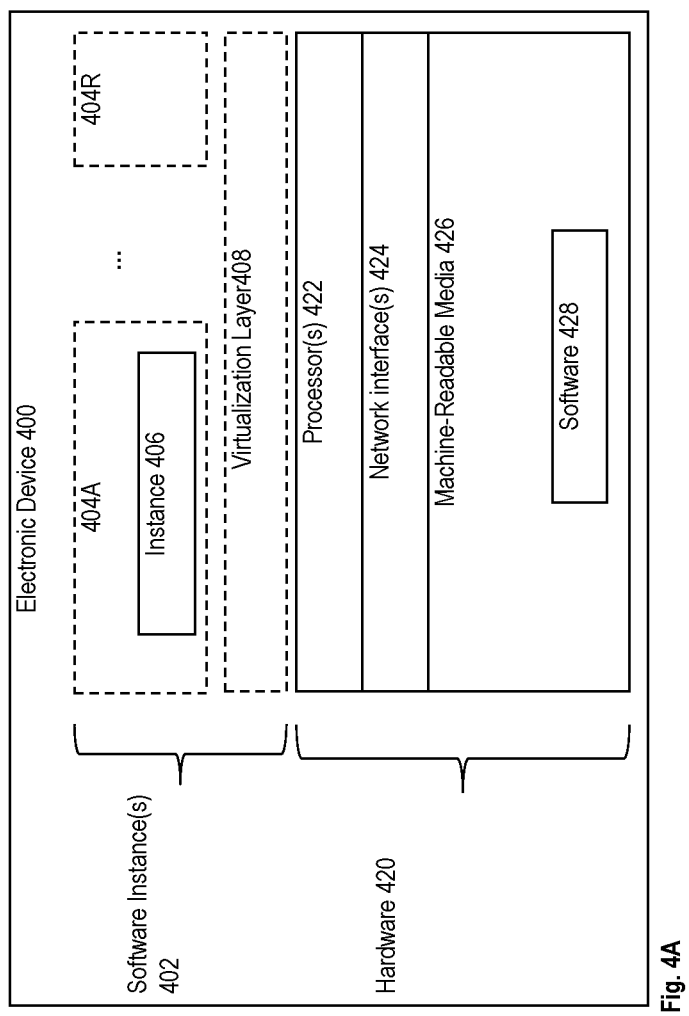
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the fault detection service may be implemented in one or more electronic devices 400. In one implementation: 1) each of the clients is implemented in a separate one of the electronic devices 400 (e.g., in end user devices where the software 428 represents the software to implement clients to interface directly and/or indirectly with the fault detection service (e.g., software 428 represents a web browser, a native client, a portal, a command-line interface, and/or an application programming interface (API) based upon protocols such as Simple Object Access Protocol (SOAP), Representational State Transfer (REST), etc.)); 2) the fault detection service is implemented in a separate set of one or more of the electronic devices 400 (e.g., a set of one or more server devices where the software 428 represents the software to implement the fault detection service); and 3) in operation, the electronic devices implementing the clients and the fault detection service would be communicatively coupled (e.g., by a network) and would establish between them (or through one or more other layers and/or or other services) connections for submitting requests and/or making API calls to the fault detection service. Other configurations of electronic devices may be used in other implementations (e.g., an implementation in which the client and the fault detection service are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 4B:
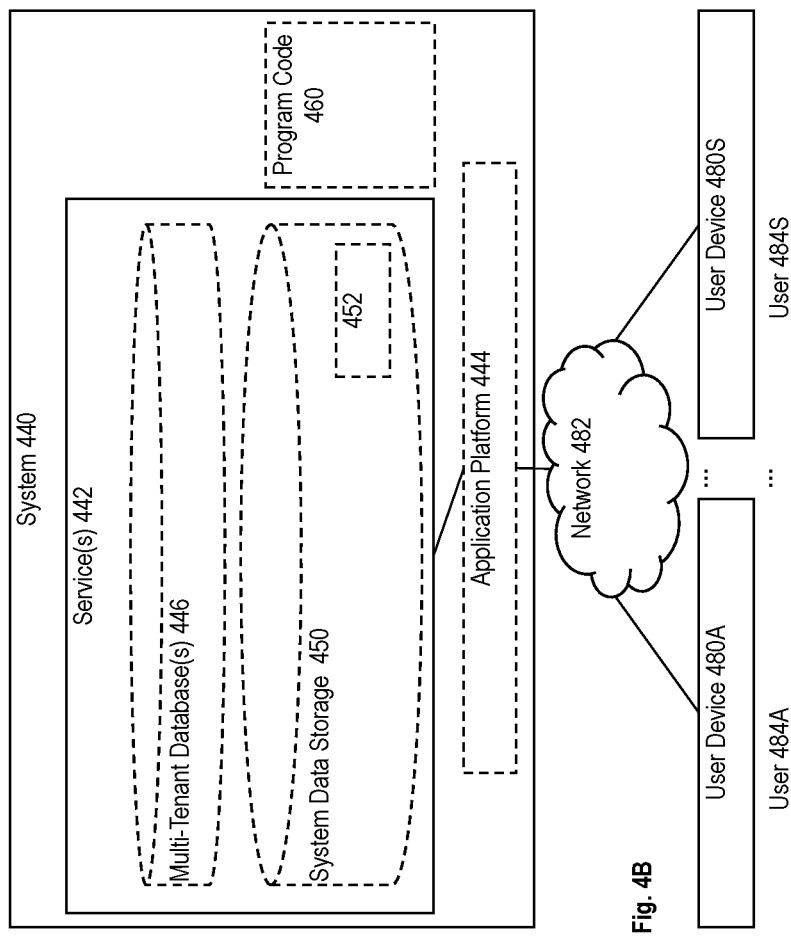
FIG. 4B is a block diagram of a deployment environment according to some example implementations.

FIG. 4B is a block diagram of a deployment environment according to some example implementations. A system 440 includes hardware (e.g., a set of one or more server devices)

and software to provide service(s) 442, including the fault detection service. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the fault detection service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $6^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of identifying a change associated with an update to executable code resulting in failure of one or more tests, the method comprising:
    for each change of a plurality of changes associated with the update:
        identifying one or more characteristics associated with the change; and
        calculating a respective value for a risk score associated with the respective change based on the one or more characteristics associated with the change;
    identifying a first change from among the plurality of changes based on the respective values for the risk score associated with the respective changes;

generating a modified update to the executable code including the first change by excluding remaining changes of the plurality of changes from the modified update;
executing the one or more tests with respect to a compiled version of the modified update to the executable code;
obtaining test result data associated with the one or more tests executed against the compiled version of the modified update to the executable code; and
in response to validating the first change when the test result data indicates the one or more tests executed successfully:
identifying a second change from among the plurality of changes having a next highest value for the risk score based on the respective values for the risk score associated with the respective changes;
generating a second modified update to the executable code including the second change by excluding remaining changes of the plurality of changes from the modified update; and
executing the one or more tests with respect to a second compiled version of the second modified update to the executable code.

2. The method of claim 1, wherein:
identifying the one or more characteristics comprises determining first values for one or more quantitative characteristics associated with the first change based on source code associated with the first change; and
calculating the respective value for the risk score comprises calculating the respective value for the risk score associated with the first change based at least in part on the first values for the one or more quantitative characteristics.

3. The method of claim 2, wherein:
identifying the one or more characteristics comprises identifying second values for one or more qualitative characteristics associated with the first change; and
calculating the respective value for the risk score comprises calculating the respective value for the risk score associated with the first change based at least in part on the first values for the one or more quantitative characteristics and the second values for the one or more qualitative characteristics.

4. The method of claim 3, wherein calculating the respective value comprises inputting the first values for the one or more quantitative characteristics and the second values for the one or more qualitative characteristics into a risk prediction model providing an output value for the risk score as a function of the one or more quantitative characteristics and the one or more qualitative characteristics.

5. The method of claim 4, wherein:
the risk prediction model comprises a random forest model; and
calculating the respective value comprises:
for each characteristic of the one or more qualitative characteristics and the one or more quantitative characteristics, converting a respective input value for the respective characteristic into an intermediate value indicative of a probability of a test failure corresponding to the respective input value using a respective decision tree associated with the respective characteristic; and
determining the output value for the risk score based on the respective intermediate values corresponding to the respective characteristics of the one or more qualitative characteristics and the one or more quantitative characteristics.

6. The method of claim 1, wherein the update comprises autobuild code comprising executable source code for an application platform capable of providing instances of a virtual application.

7. The method of claim 1, further comprising:
identifying the first change as a potential root cause of the failure of the one or more tests when the test result data indicates a test failure.

8. The method of claim 1, further comprising:
validating the first change when the test result data indicates the one or more tests executed successfully.

9. The method of claim 1, further comprising providing, at a client device, indication of the respective value for the risk score associated with the first change.

10. The method of claim 1, wherein:
identifying the first change comprises selecting a highest risk change from among the plurality of changes based on the respective values for the risk score associated with the respective changes; and
the modified update includes the highest risk change.

11. A non-transitory machine-readable storage medium that provides instructions that, when executed by a processor, are configurable to cause said processor to perform operations comprising:
for each change of a plurality of changes associated with an update to executable code resulting in failure of one or more tests:
identifying one or more characteristics associated with the change; and
calculating a respective value for a risk score associated with the respective change based on the one or more characteristics associated with the change;
identifying a first change from among the plurality of changes based on the respective values for the risk score associated with the respective changes;
generating a modified update to the executable code including the first change by excluding remaining changes of the plurality of changes from the modified update; initiating execution of the one or more tests with respect to a compiled version of the modified update to the executable code;
obtaining test result data associated with the one or more tests executed against the compiled version of the modified update to the executable code; and
in response to validating the first change when the test result data indicates the one or more tests executed successfully:
identifying a second change from among the plurality of changes having a next highest value for the risk score based on the respective values for the risk score associated with the respective changes;
generating a second modified update to the executable code including the second change by excluding remaining changes of the plurality of changes from the modified update; and
executing the one or more tests with respect to a second compiled version of the second modified update to the executable code.

12. The non-transitory machine-readable storage medium of claim 11, wherein the instructions are configurable to cause said processor to:
determine first values for one or more quantitative characteristics based on source code associated with the first change; and
calculate the respective value for the risk score associated with the first change based at least in part on the first values for the one or more quantitative characteristics.

13. The non-transitory machine-readable storage medium of claim 12, wherein the instructions are configurable to cause said processor to:
   identify second values for one or more qualitative characteristics associated with the first change; and
   calculate the respective value for the risk score based at least in part on the first values for the one or more quantitative characteristics and the second values for the one or more qualitative characteristics.

14. The non-transitory machine-readable storage medium of claim 13, wherein the instructions are configurable to cause said processor to input the first values for the one or more quantitative characteristics and the second values for the one or more qualitative characteristics into a risk prediction model outputting the respective value for the risk score associated with the first change as a function of the one or more quantitative characteristics and the one or more qualitative characteristics.

15. The non-transitory machine-readable storage medium of claim 11, wherein the instructions are configurable to cause said processor to:
   identify the first change as a potential root cause of the failure of the one or more tests when the test result data indicates a test failure.

16. A computing system comprising:
   a non-transitory machine-readable storage medium that stores software; and
   a processor, coupled to the non-transitory machine-readable storage medium, to execute the software that implements a fault detection service and that is configurable to:
      calculate respective values for a risk score associated with respective changes of a plurality of changes associated with an update to executable code resulting in test failure based on change characteristics associated with the respective change;
      identify a first change from among the plurality of changes based on the respective values for the risk score associated with the respective changes;
      generate a modified update to the executable code including the first change by excluding remaining changes of the plurality of changes from the modified update;
      initiate execution of one or more tests with respect to a compiled version of the modified update to the executable code;
      obtain test result data associated with the one or more tests executed against the compiled version of the modified update to the executable code; and
      in response to validating the first change when the test result data indicates the one or more tests executed successfully:
         identify a second change from among the plurality of changes having a next highest value for the risk score based on the respective values for the risk score associated with the respective changes;
         generate a second modified update to the executable code including the second change by excluding remaining changes of the plurality of changes from the modified update; and
         execute the one or more tests with respect to a second compiled version of the second modified update to the executable code.

17. The computing system of claim 16, wherein the software is configurable to determine values for one or more quantitative characteristics based on source code associated with the first change and calculate the respective value for the risk score associated with the first change based at least in part on the values for the one or more quantitative characteristics.

* * * * *